(12) United States Patent
Gekht et al.

(10) Patent No.: US 6,918,743 B2
(45) Date of Patent: Jul. 19, 2005

(54) SHEET METAL TURBINE OR COMPRESSOR STATIC SHROUD

(75) Inventors: Eugene Gekht, Brossard (CA); Franco Di Paola, Montreal (CA)

(73) Assignee: Pratt & Whitney Canada Ccorp., Quebec (CA)

( * ) Notice: Subject to any disclaimer, the term of this patent is extended or adjusted under 35 U.S.C. 154(b) by 66 days.

(21) Appl. No.: 10/277,919

(22) Filed: Oct. 23, 2002

(65) Prior Publication Data

US 2005/0042077 A1 Feb. 24, 2005

(51) Int. Cl.$^7$ .............................................. F01D 11/08
(52) U.S. Cl. .................................. 415/139; 415/173.1
(58) Field of Search ............................. 415/115, 116, 415/173.1, 200, 138, 139

(56) References Cited

U.S. PATENT DOCUMENTS

| | | | |
|---|---|---|---|
| 3,603,599 A | * 9/1971 | Laird | 415/173.5 |
| 3,844,343 A | 10/1974 | Burggraf | |
| 4,529,355 A | 7/1985 | Wilkinson | |
| 4,551,064 A | 11/1985 | Pask | |
| 4,796,423 A | 1/1989 | Lievestro et al. | |
| 4,801,070 A | 1/1989 | Hom et al. | |
| 4,921,401 A | 5/1990 | Hall et al. | |
| 5,145,316 A | 9/1992 | Birch | |
| 5,161,944 A | 11/1992 | Wood | |
| 5,188,507 A | * 2/1993 | Sweeney | 415/173.1 |
| 5,192,185 A | * 3/1993 | Leonard | 415/173.3 |
| 5,201,846 A | 4/1993 | Sweeney | |
| 5,344,284 A | * 9/1994 | Delvaux et al. | 415/173.2 |
| 5,971,703 A | 10/1999 | Bouchard | |
| 6,267,555 B1 | * 7/2001 | Chien et al. | 415/200 |
| 6,309,177 B1 | 10/2001 | Swiderski et al. | |
| 6,340,286 B1 | * 1/2002 | Aksit et al. | 415/173.4 |
| 6,575,694 B1 | * 6/2003 | Thompson et al. | 415/200 |

FOREIGN PATENT DOCUMENTS

GB 881880 11/1961

* cited by examiner

*Primary Examiner*—F. Daniel Lopez
*Assistant Examiner*—Igor Kershteyn
(74) *Attorney, Agent, or Firm*—Ogilvy Renault

(57) ABSTRACT

A static shroud for ducting an axial gas flow past an array of blades rotating about an axis, made of a sheet of metal bent to form a contiguous shroud body having a substantially uniform sheet thickness and a uniform axial profile, initiating with an upstream flange flowing into a tip clearance portion and terminating in a downstream flange.

2 Claims, 3 Drawing Sheets

SHEET METAL TURBINE OR COMPRESSOR STATIC SHROUD

TECHNICAL FIELD

The invention relates to a static shroud for a gas turbine engine made of a sheet of metal bent to form a contiguous shroud body having a substantially uniform sheet thickness and a uniform axial profile.

BACKGROUND OF THE ART

Gas turbine engines conventionally require precisely manufactured shroud rings for maintaining the optimum clearance between the tips of compressor blades or turbine blades and the interior surface of the shrouds over the operating range of rotor speed and temperature variations. Accurate blade tip clearance is required since an over sized gap would reduce the efficiency of a compressor or turbine whereas gap that is too small may result in excessive contact between the blade tips and the interior of the shroud ring.

The necessity of accurate manufacturing tolerance for shroud rings is complicated by the need to accommodate thermal expansion and contraction. Conventional shrouds are often manufactured from forged or cast segments that can expand circumferentially when subjected to extreme heat in the turbine section for example. Cooling air withdrawn from the compressor section also aids in controlling expansion by providing impingement cooling of the shroud segments. Shroud cooling increases component life and operating safety margin. Stress on components and oxidation of materials increases with higher temperatures. To impede leakage between shroud segments, feather seals are usually provided.

A significant disadvantage of conventional shroud manufacture is the high cost of materials and labour involved. Due to high temperatures and the critical nature of the shroud it has been considered necessary to construct shroud segments from forgings of very expensive high temperature alloys. Shroud segments are conventionally produced by machining a significant proportion of the material from thick forged rings. Of the material used to produce the forged rings, approximately 70% of the material is removed during machining operations and converted to scrap metal chips. The high temperature alloys that are used are also of very low machineability. Such complex configurations require use of specialized machine tools, rough machining and finish machining processes as well as grinding of the interior surface adjacent to the blade tips.

The environment within which the conventional shroud segments perform is highly demanding. Reliability and predictable performance of aircraft engines is obviously required since they operate in conditions where failure can result in catastrophe. The importance of critical components such as turbine rotors or turbine shrouds exposed to high rotational speeds, high temperature oxidation, expansion and contraction and vibration have led designers to conventionally specify that critical shroud segments must be manufactured of high strength, high cost alloys in an extremely accurate manner requiring forged components that are accurately machined with great precision.

It is an object of the present invention to provide a lower cost alternative to the manufacture of shroud ring segments from forging of high temperature resistant alloys where a significant portion of the forging is reduced to scrap metal in the machining process.

It is a further object of the invention to produce a shroud ring minimizing the number of axially extending gaps and preferably eliminating gaps altogether.

Further objects of the invention will be apparent from review of the disclosure, drawings and description of the invention below.

DISCLOSURE OF THE INVENTION

The invention provides a static shroud for ducting an axial gas flow past an array of blades rotating about an axis, made of a sheet of metal bent to form a contiguous shroud body having a substantially uniform sheet thickness and a uniform axial profile, initiating with an upstream flange flowing into a tip clearance portion and terminating in a downstream flange.

The invention therefore enables designers to accommodate the high temperature environment around turbines or high-pressure stages of axial compressors with shrouds segments formed from sheet metal or metal strips rather than conventional machine forgings. Tip clearance control can be maintained using sheet metal shroud segments without the need for extensive machining that is currently required for forged segments to achieve the same accuracy. Shroud segments produced by machining of thick forged rings require specialized tools to create the complex reverse curves of conventional shroud segments. Expensive high temperature alloys used for such segments are more economically provided in sheet form with highly precise thickness as opposed to extensive machining which results in large volumes of scrap metal. High temperature alloys such as 600 or 625 Inconel™ or other nickel alloys are of very low machineability and require significant effort including rough machining, finish machining and grinding to produce finished components. In contrast, sheet metal components may be formed in a press if segments are produced or may be rolled into a complete ring by roll forming manufacturing methods.

Further advantages of sheet metal include highly accurate thickness and improved quality control compared to forgings. Cold rolling of the sheet metal can be used to increase or regulate the strength of the metal and to provide an improved finished surface that does not require machining.

Formed segments of sheet metal may be manufactured with excess thickness in the tip clearance portion. The interior surface of the tip clearance portion may be ground by placing segments in an assembly jig to achieve the required accuracy for the interior tip clearance gap between the blade tips and the interior surface of the sheet metal shroud segments.

DESCRIPTION OF THE DRAWINGS

In order that the invention may be readily understood, two embodiments of the invention are illustrated by way of example in the accompanying drawings.

Further details of the invention and its advantages will be apparent from the detailed description included below.

DETAILED DESCRIPTION OF PREFERRED EMBODIMENTS

Figure 1:
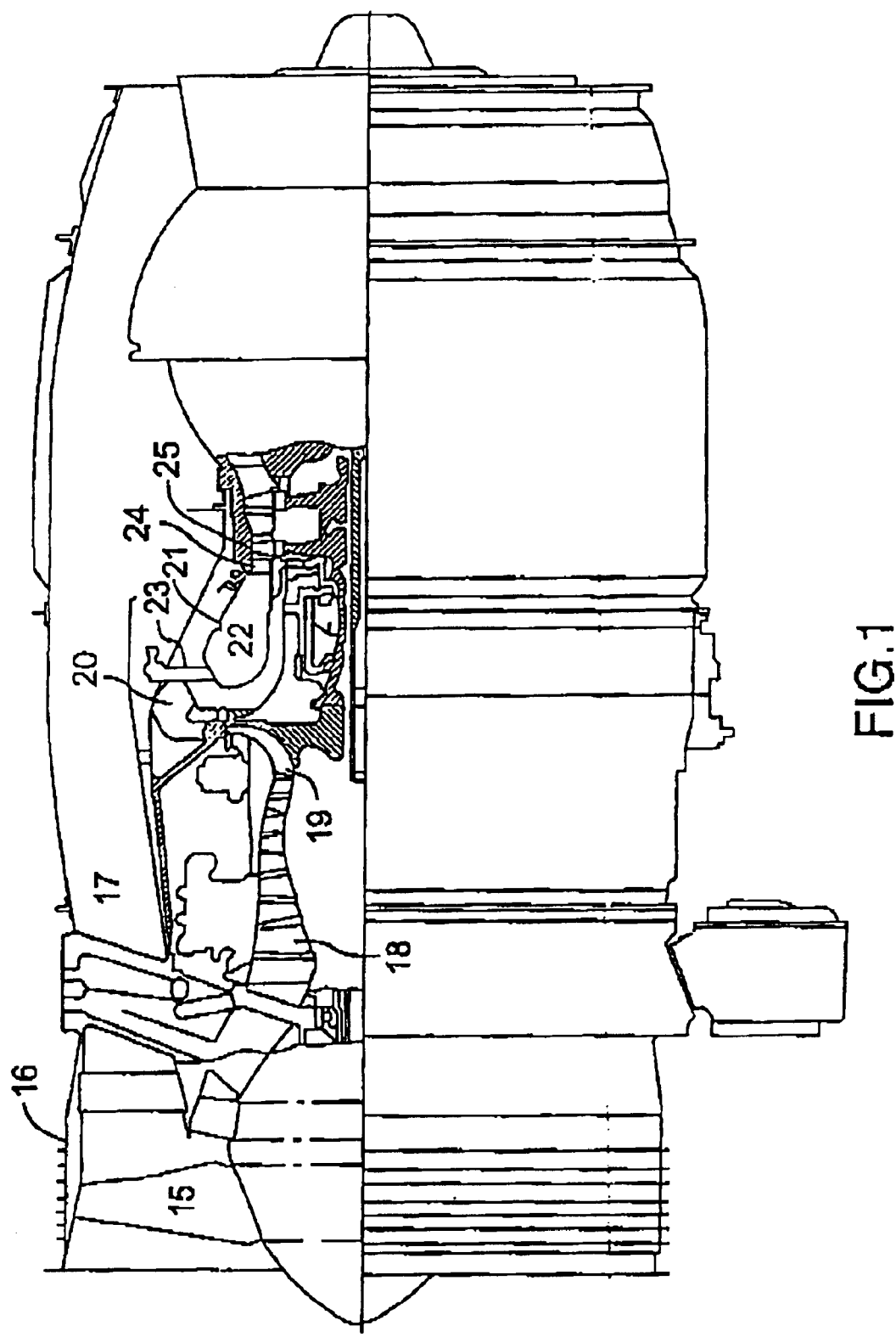
FIG. 1 is an axial cross-sectional view through one of the typical gas turbine engines showing an axial compressor section and turbine section to which the invention is applicable.

FIG. 1 shows an axial cross-section through a turbo-fan gas turbine engine. It will be understood however that the invention is equally applicable to any type of engine with a combustor and turbine section such as a turbo-shaft, a turbo-prop, or auxiliary power units. Air intake into the engine passes over fan blades 15 surrounded by a fan case 16. The air is split into an outer annular flow which passes through the bypass duct 17 and an inner flow which passes through the low-pressure axial compressor 18 and high-pressure centrifugal compressor 19. Compressed air exits the compressor 19 through a diffuser 20 and is contained within a plenum 21 that surrounds the combustor 22. Fuel is supplied to the combustor 22 through fuel tubes 23 which is mixed with air from the plenum 21 when sprayed through nozzles into the combustor 22 as a fuel air mixture that is ignited. A portion of the compressed air within the plenum 21 is admitted into the combustor 22 through orifices in the side walls to create a cooling air curtain along the combustor walls or is used for impingement cooling eventually mixing with the hot gases from the combustor and passing over the nozzle guide vane 24 and past turbines 25 before exiting the tail of the engine as exhaust.

The invention is applicable to shrouds about any rotor within the gas turbine engines such as axial compressor sections or turbine sections.

Figure 2:
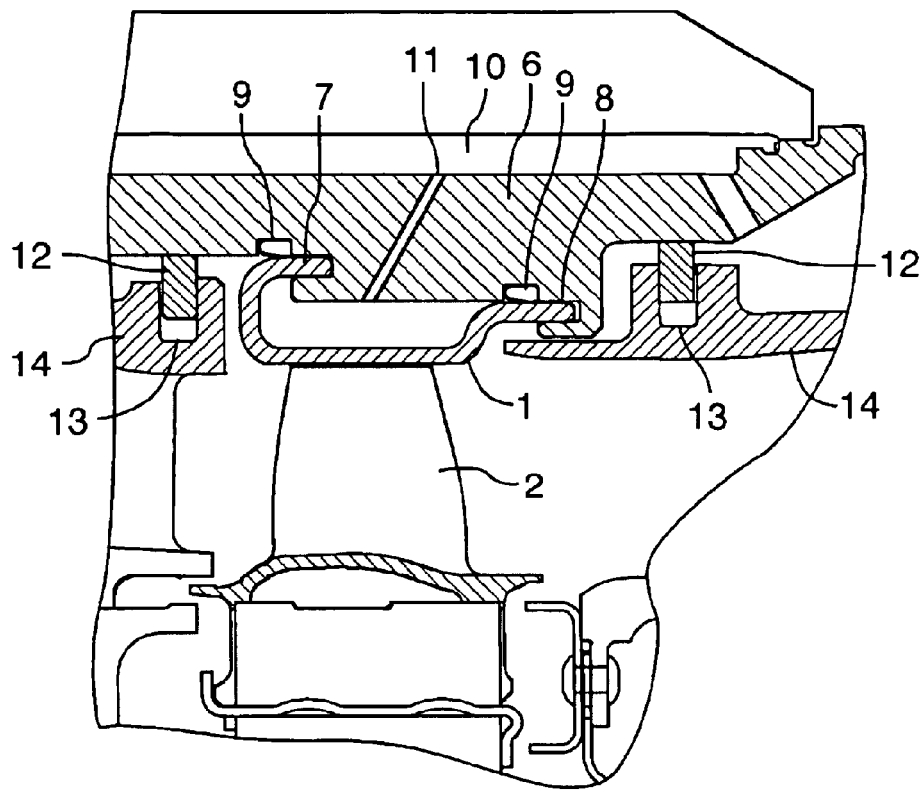
FIG. 2 is a detailed axial sectional view through a turbine shroud in accordance with a first embodiment of the invention.
Figure 3:
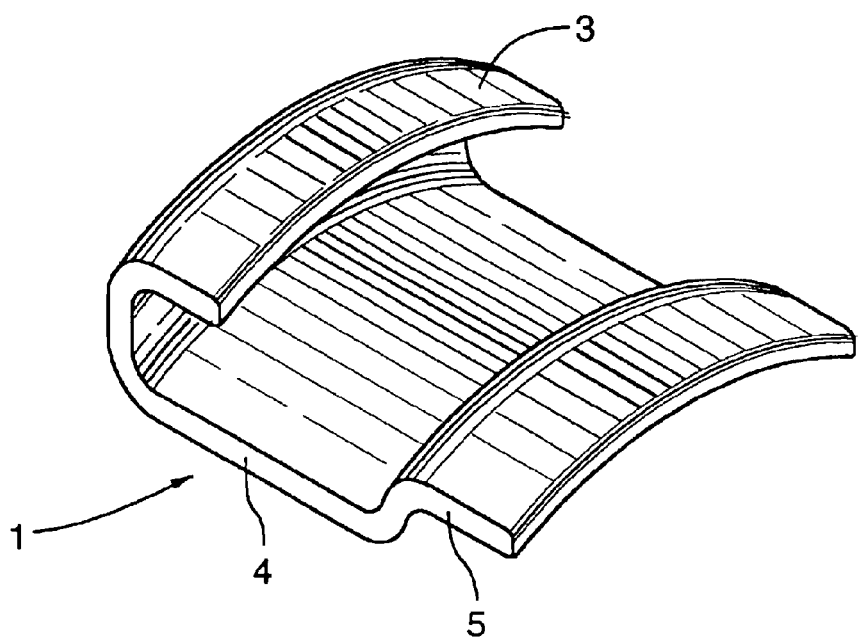
FIG. 3 is an exterior perspective view of a sheet metal static shroud of FIG. 2.
Figure 4:
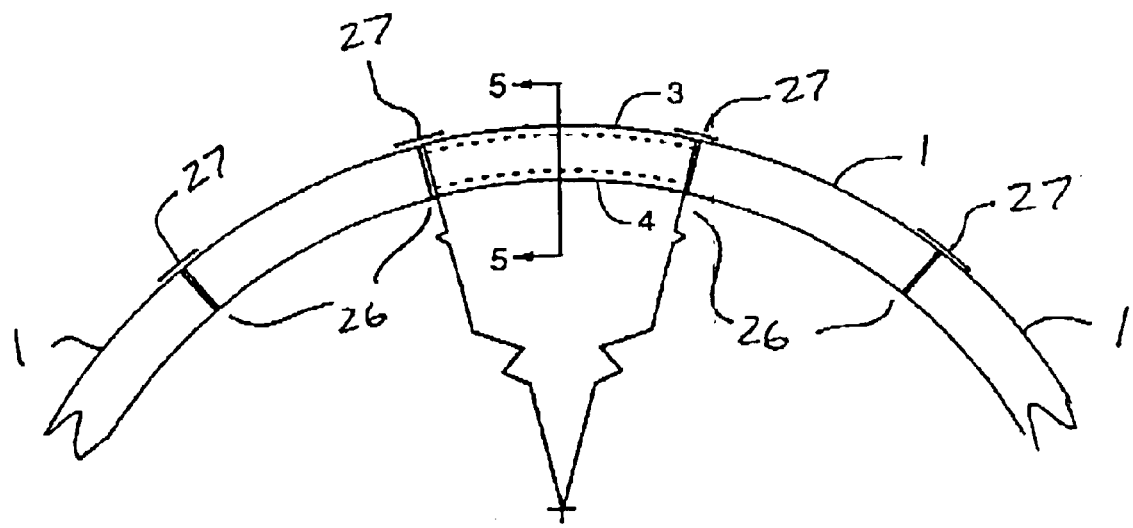
FIG. 4 is radial elevation view of the shroud segment of FIG. 3.
Figure 5:
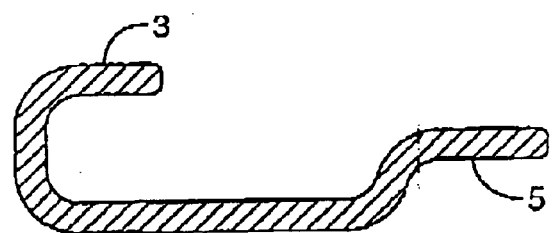
FIG. 5 is a cross-sectional view along lines 5—5 of FIG. 4.

FIG. 2 shows an example embodiment of the static shroud 1 having an internal tip clearance surface for ducting an axial flow of gas past an array of blades 2 rotating about the engine axis. As best seen in FIGS. 3, 4 and 5 the static shroud 1 is advantageously formed of sheet metal which is bent to form a contiguous shroud body having a substantially uniform sheet thickness and a uniform axial profile.

The contiguous shroud body initiates with an upstream flange 3 that in first embodiment flows in a reverse bend into a tip clearance portion 4 and terminates in a downstream flange 5. The sheet metal may be produced of the same high temperature alloys as conventionally forging such as 600 or 625 Inconel™ alloy however production of sheet metal is much less expensive, forming of the shroud segments or a complete shroud ring is much less expensive compared to machining of such high strength low machineability materials and the utilization of material is much improved since machining removes significant amounts of material up to 70% for example.

As shown in FIG. 3, the shroud 1 can be produced in a circumferential array of shroud segments with axially extending gaps 26 between each segment. Alternatively, the shroud 1 can be produced from sheet metal in a complete ring by known roll forming methods with a single gap 26 between abutting end faces or may be welded to create a complete ring which is then machined or finished ground to final dimensions. Sealing strips 27 may be used to span between adjacent shrouds segments over any gaps 26 between segments, if there is a performance requirement.

Figure 6:
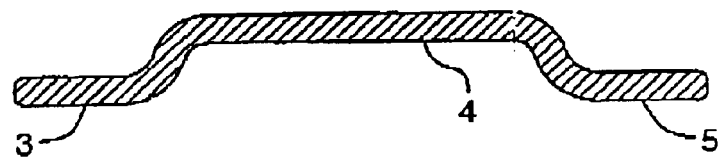
FIG. 6 is a second embodiment of the invention showing another example configuration of a sheet metal shroud segment in cross-section.

In the embodiment shown in FIGS. 2 through 5, the shroud 1 has a profile with flanges 3 and 5 extending axially rearwardly from the tip clearance portion 4. Alternatively, FIG. 6 shows flanges 3 and 5 extending forwardly and rearwardly respectively from the tip clearance portion 4.

The invention provides a simple contiguous shroud body with substantially uniform sheet thickness and uniform axial profile without the complexities of the prior art forged and machined components.

As shown in FIG. 2 the static shroud assembly includes an annular casing 6 radially outward of the shroud 1. The casing 6 includes an upstream slot 7 and a downstream slot 8 which sliding retain the upstream flange 3 and downstream flange 5 respectively. The shroud 1 is permitted a degree of axial motion and is engaged by seals 9 between the casing 6 and shroud 1. The casing 6 has a compressed air plenum 10 in communication with source of compressed cooling air (such as the high pressure compressor section) and includes a plurality of radially extending impingement cooling orifices 11 disposed adjacent to the tip clearance portion 4 of the shroud body 1 to provide cooling. Air provided for cooling through the impingement cooling orifices 11 is allowed to escape into the hot gas path to axially extending gaps between shroud segments for example. In the embodiment shown in FIG. 2, the flanges 3 and 5 extend axially and therefore to permit relative radial movement, the casing 6 includes radially extending axial restraint abutments 12 which are engaged in radially extending slots 13 in the adjacent outer hot gas path wall 14.

Although the above description relates to specific preferred embodiments as presently contemplated by the inventors, it will be understood that the invention in its broad aspect includes mechanical and functional equivalents of the elements described herein.

We claim:

1. A method of manufacturing a shroud, comprising the steps of:

providing an integrally contiguous sheet metal shroud, the shroud including integral attachment members on either side of a tip clearance portion oversized in initial thickness; and adjusting the initial thickness of the sheet metal of the tip clearance portion to adjust tip clearance relative to an array of blades.

2. A method of manufacturing a shroud according to claim 1 wherein at least one of the step of providing and the step of adjusting, include a metalworking step selected from the group consisting of: cutting; bending; forming; roll forming; machining; and grinding.

* * * * *